United States Patent [19]
Helton

[11] Patent Number: 5,388,938
[45] Date of Patent: Feb. 14, 1995

[54] STRAP HOOK RETAINER

[76] Inventor: Jesse D. Helton, Box 361, Crocker, Mo. 65452

[21] Appl. No.: 213,557

[22] Filed: Mar. 16, 1994

[51] Int. Cl.⁶ .......................... B60P 7/08; B61D 45/00
[52] U.S. Cl. ..................................... 410/101; 410/100; 410/104; 24/68 CD
[58] Field of Search .................. 410/97, 100, 103, 104, 410/106, 108, 110, 115, 116, 101; 24/68 CD, 69 CT, 69 ST, 69 WT, 70 ST, 265 CD; 248/499, 503

[56] References Cited

U.S. PATENT DOCUMENTS

| | | | |
|---|---|---|---|
| 2,919,895 | 1/1960 | Johnson | 24/68 CD X |
| 3,357,670 | 12/1967 | Larson | 410/106 |
| 4,138,950 | 2/1979 | Mooney et al. | 410/108 X |
| 4,340,329 | 7/1982 | Ericsson | 410/100 |
| 4,428,099 | 1/1984 | Richmond | 410/100 X |
| 4,531,869 | 7/1985 | Hemmings | 410/107 |
| 4,567,628 | 2/1986 | Prete, Jr. et al. | 24/68 |
| 4,715,754 | 12/1987 | Scully | 410/107 |
| 5,234,298 | 8/1993 | Shuker | 410/100 X |

Primary Examiner—Michael S. Huppert
Assistant Examiner—Stephen Gordon
Attorney, Agent, or Firm—Herzog, Crebs & McGhee

[57] ABSTRACT

A strap hook retainer for releasably retaining the hook portion of a hold down strap. The retainer includes a rectangular frame having a first opening of a first dimension in a first elongated side, and a second opening of a second dimension in a second elongated side disposed opposite the first side. A pivoting plate is located within the frame and is attached to and pivoted by an arm that extends through, and is supported by, the two short sides of the rectangular frame. The hook may be inserted into the frame via the first opening and is retained by the pivoting plate as the hook extends through the second opening and the pivoting plate pivots downward to engage the "U" portion of the hook. The hook is prevented from release by the configuration of the second opening until the plate is manually pivoted into a raised position. The hook may then be removed from the frame while the plate is held in the raised pivot position.

2 Claims, 4 Drawing Sheets

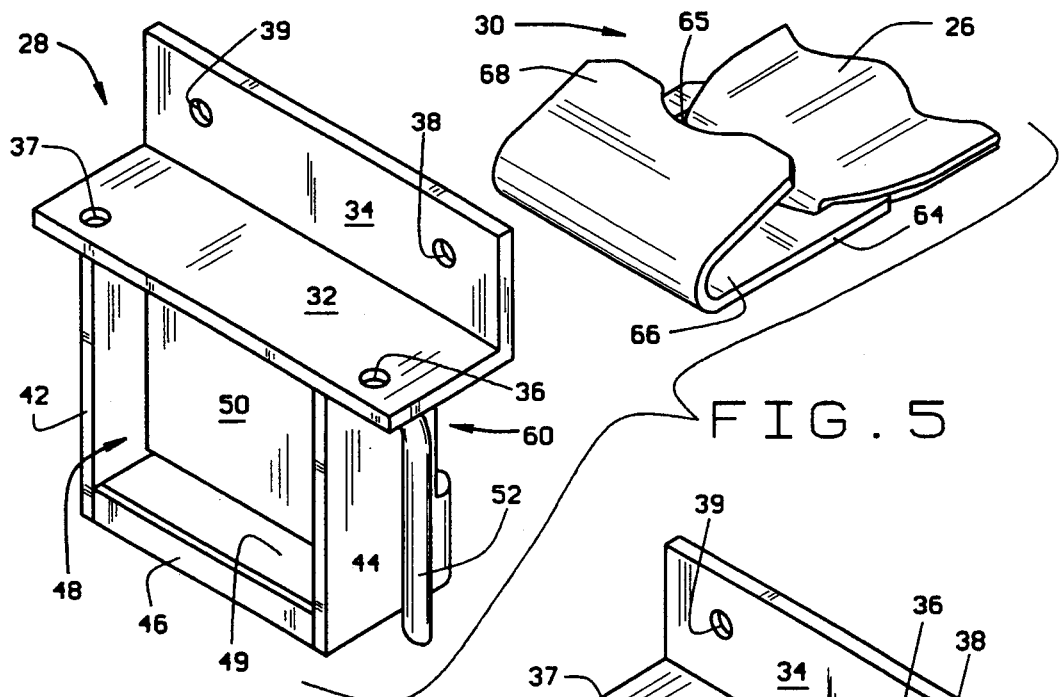
FIG. 5
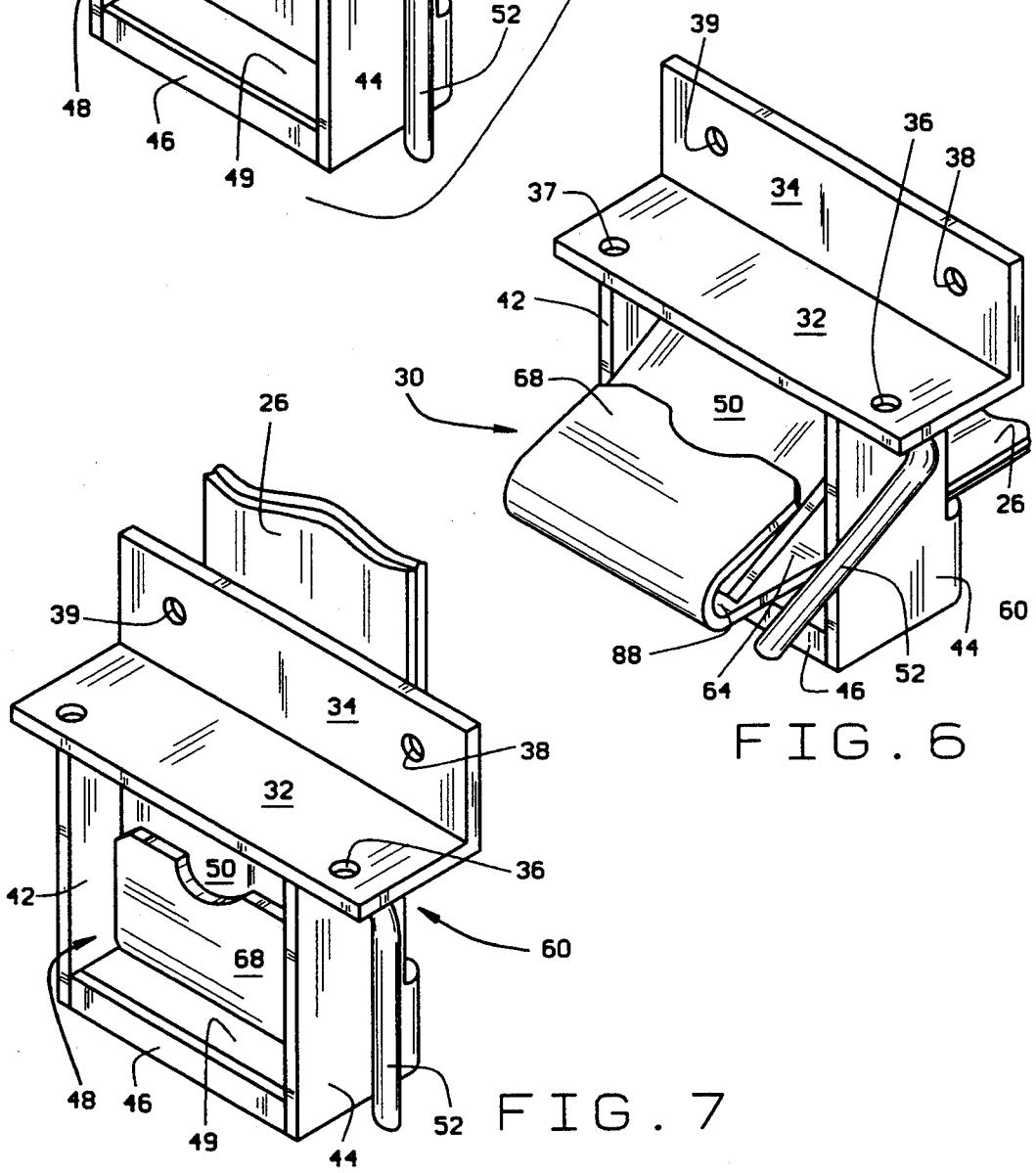
FIG. 6
FIG. 7

STRAP HOOK RETAINER

FIELD OF THE INVENTION

The present invention relates to tie-down mechanisms for cargo arranged on transportation trailers and, more particularly to the retention of straps having strap hooks used to secure loads onto a truck.

BACKGROUND OF THE INVENTION

Transportation of cargo in modern society is generally accomplished by carriers utilizing some form of platform onto which the goods are placed. With such platforms, however, it is necessary to secure the cargo in some manner in order to prevent the cargo from shifting.

Trucks with flatbeds are one such commonly utilized platform transportation medium in which to haul or convey various types of cargo. As with other types of platforms, the cargo needs to be retained or secured upon the flatbed such that during transportation the cargo does not shift or fall from the flatbed.

In order to hold the cargo in place and prevent such shifting, chains or straps have been utilized in various configurations. Usually, the chains or straps are attached to one side of the flatbed frame and either secured to the cargo itself or lashed across the cargo under sufficient tension and tied off on the opposite side of the flatbed frame.

Prior art chains are generally bulky and cumbersome to use. Furthermore, the use of chains generally requires a winch-type device or tension creating device to develop adequate tension on the chains for effective cargo control. Steel bands have also been used, but they likewise are cumbersome and somewhat precarious to use.

A more recent development is the textile band or strap, usually made from synthetic fibers, that offers an easier way of lashing the cargo. One end of the synthetic strap is generally secured to a side of the flatbed while the other end generally includes a strap hook. However, the strap hook needs to be securely retained to prevent its becoming disengaged should slack occur in the strap.

It is thus an object of the present invention to provide a strap hook retainer that is simple but effective in retaining the strap hook until positively released by the operator.

It is also an object of the present invention to provide a strap hook retainer that will not release the strap hook when slack is encountered in the strap.

SUMMARY OF THE INVENTION

In accordance with the above objects, the present invention provides a strap hook retainer for releasably retaining the hook portion of a hold down strap. The strap hook retainer is adapted to be mounted on the side of a platform-type cargo transportation medium such as a flatbed trailer.

The present strap hook retainer permits easy insertion and positive retention of a strap hook, regardless of slack in the strap, until the strap hook is manually removed from the strap hook retainer.

In one embodiment, the strap hook retainer includes a rectangular frame having a first opening of a first dimension in a first elongated side, and a second opening of a second dimension in a second elongated side disposed opposite the first side. A pivoting plate is located within the frame and is attached to and pivoted by an arm that extends through and is supported by the two short sides of the rectangular frame. A strap hook may be inserted into the frame via the first opening and is retained by the pivoting plate as the hook extends through the second opening and the pivoting plate pivots downward to engage the "U" portion of the hook. The hook is prevented from release by the configuration of the second opening until the plate is manually pivoted into a raised position. The hook may then be removed from the frame while the plate is held in the raised pivot position.

The pivoting plate outwardly swings through the second opening and beyond a plane defined by the second opening to permit the strap hook to also extend therethrough such that the plate is caught within the "U" portion of the strap hook. The plate then retains the strap hook within the strap hook retainer frame. The pivoting plate is prevented from pivoting beyond the plane of the first opening by the dimension of the first opening. In this manner the strap hook cannot be pulled out from the front (first opening) and must be positively released by the operator through the pivot lever.

In one embodiment, the strap hook retainer is fixedly mounted so as to be permanently located along the side of the trailer, while another embodiment allows the strap hook retainer to be adjustable along the length of the flatbed. The adjustable embodiment permits greater flexibility in securing different types of loads.

BRIEF DESCRIPTION OF THE DRAWINGS

So that the manner in which the above-recited features, advantages, and objects of the present invention are attained and can be understood in detail, a more particular description of the invention, briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments. Reference the appended drawings, wherein:

FIG. 5 is an elevational view of the strap hook retainer and a strap hook about to be inserted into the strap hook retainer;

FIG. 6 is an elevational view of the strap hook retainer of FIG. 5 wherein the strap hook has been extended therethrough;

FIG. 7 is an elevational view of the strap hook retainer with the strap hook fully retained therein;

DETAILED DESCRIPTION

Figure 1:
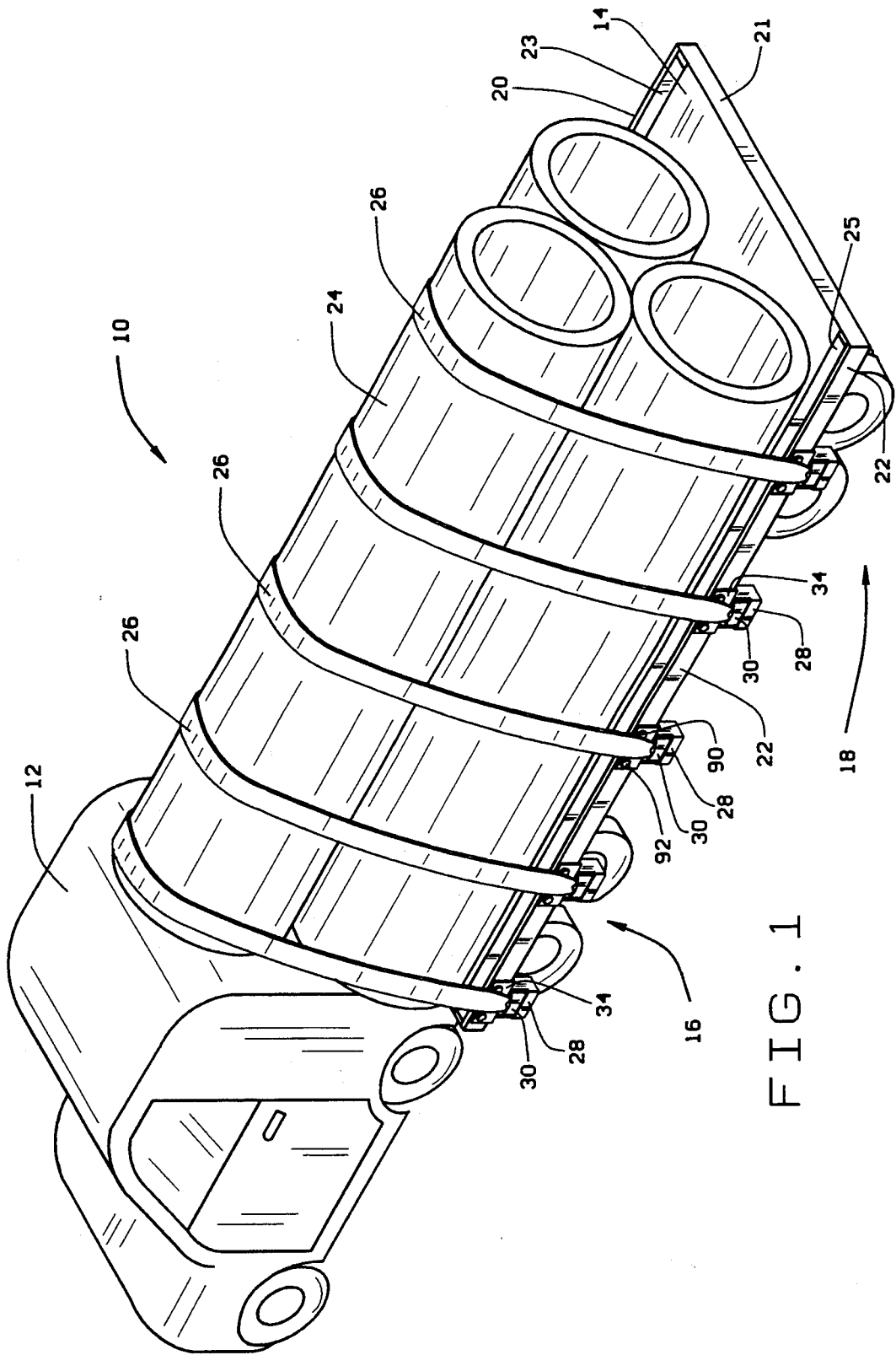
FIG. 1 is an elevational view of a truck carrying a load on a flatbed trailer, the load being held in place by straps having hooks, the hooks being retained in a plurality of strap hook retainers in accordance with the present invention.

Referring now to FIG. 1 there is shown a truck generally designated 10 consisting of a typical truck cab 12 coupled to a typical flatbed trailer 14. The flatbed trailer 14 is supported by front dual axles/wheels 16 and rear dual axles/wheels 18. A rail 21 is fixed to the rear of the flatbed 14 and extends a distance therefrom on either side, the distances represented by the numeral 23 on one side and the numeral 25 on the other side. A rail 20 is disposed on one longitudinal side of the flatbed 14 and is fixed to the end of the rail 21. The rail 20 is also fixed to an end of a front rail (not shown). Thus, the rail 20 is spaced the distance 23 (standoff) from the longitudinal side of the flatbed 14 along the entire longitudinal length thereof. In complementary fashion, a rail 22 is disposed on the other longitudinal side of the flatbed 14 and is fixed to the other end of the rail 21. The rail 22 is also fixed to an end of a front rail (not shown). Thus, the rail 22 is spaced the distance 25 (standoff) from the longitudinal side of the flatbed 14 along the entire longitudinal length thereof.

If needed, additional structural supports may be provided along the length of the trailer to assure the integrity of the relation of rails 20 and 22 as assembled to flatbed 14.

Shown disposed on the flatbed 14 is a load or cargo 24 consisting of several elongated pipes. It should be understood that the cargo depicted in FIG. 1 is only an example of the type of cargo that can utilize the present invention. Furthermore, it should also be understood that a truck flatbed is not the only type of platform that can use the present invention. Cargo 24 is immobilized by a plurality of cargo straps 26 that are adjustably attached to rail 20 at locations that are not shown. Each cargo strap 26 has a hook 30 affixed thereto (see FIG. 5) on the end opposite to the attachment to the rail 20. A plurality of strap hook retainers 28 are mounted to rail 22 corresponding to the number of straps 26. As is evident, the number of strap hook retainers 28 that may be attached to the rail 22 is limited only by the longitudinal length of the rail 22. Also, depending on the type and size of the load or cargo being hauled by the truck 10, only one or several of the plurality of straps 26 and strap hook retainers 28 may be utilized.

Each strap hook retainer 28 is mounted to the rail 22 by at least a pair of bolts 90, 92 and preferably by another pair of bolts (not shown) from the underside of the rail 22. The strap hook retainers 28 are preferably mounted so the exterior of the strap hook retainer is flush with the outside of the rail 22. This is to eliminate any part from projecting beyond a plane defined by the outside surface of the rail 22. As depicted in FIG. 1, each strap hook retainer 28 is retaining the respective hook 30 therein, the straps 26 being taut across the cargo 24. It will be understood that other conventional means of assembly, such as welding, may be used in lieu of the bolts shown.

Figure 2:
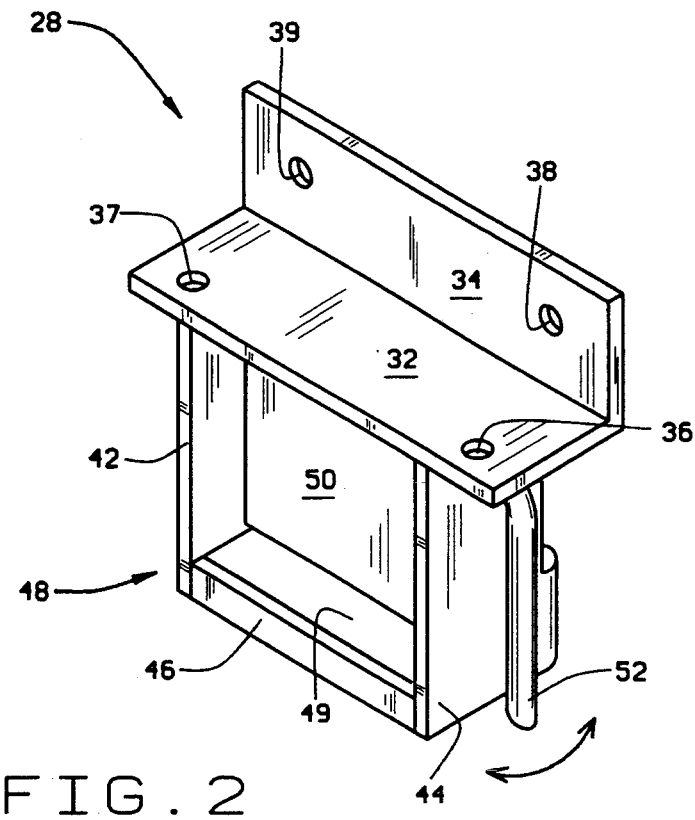
FIG. 2 is a rear elevational view of a strap hook retainer without a strap hook therein.
Figure 3:
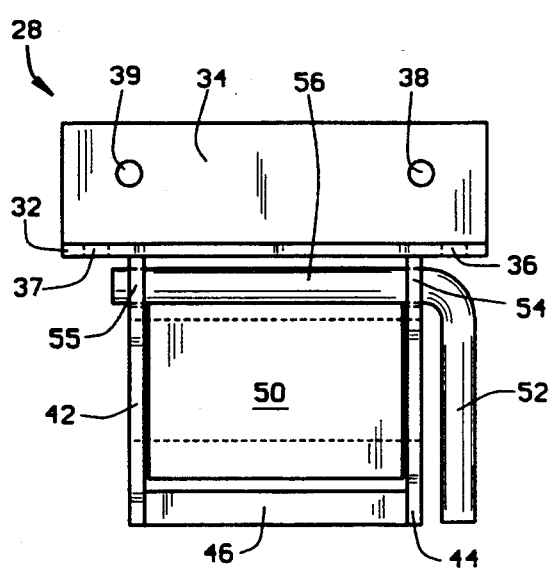
FIG. 3 is a rear view of the strap hook retainer depicted in FIG. 2.
Figure 4:
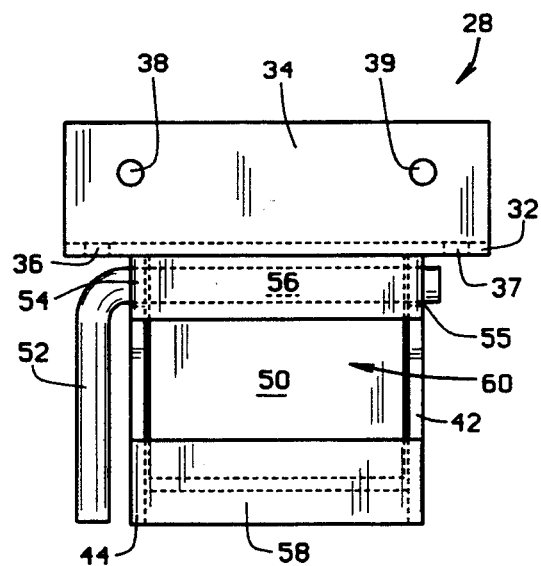
FIG. 4 is a front view of the strap hook retainer depicted in FIG. 2.

Referring now to FIGS. 2–4, a single enlarged strap hook retainer 28 is shown. Preferably, steel is utilized for each component of the strap hook retainer 28 with connections between the various components made by welding. The steel may be ¼" to 3/8" depending on the load. Applicant has had the present strap hook retainer load tested by a laboratory and it was found that the strap hook retainer can be rated at 12,000 lbs. The straps utilized in the test failed before there was a failure of the strap hook retainer.

Strap hook retainer 28 has a top plate 32 having two bores 36 and 37 disposed on opposite ends of each other. The bores 36, 37 receive respective bolts therethrough (not shown) for mounting the plate 32 to the underside of the rail 22. A stabilizing plate 34 is upwardly transversely fixed to an end of the top plate 32 and extends the longitudinal length thereof. Like plate 32, plate 34 includes two bores 38 and 39 disposed on opposite ends of each other. The bores 38, 39 receive respective bolts 90, 92 (see FIG. 1) for mounting the plate 34 to the side of rail 22.

A side wall 42 is downwardly transversely fixed to the underside of plate 32 proximate but axially inwardly relative to bore 37. A side wall 44 is downwardly transversely fixed to the underside of plate 32 proximate but axially inwardly relative to bore 36. At what is arbitrarily termed the rear, strap hook retainer 23 includes a rear bottom cross-member 46 that extends between and is fixed to the lower portion of walls 42 and 44. Rear end faces of plate 32 and walls 42 and 44, as well as rear bottom cross-member 46 define a rear or second opening 48 of a given dimension. The bottom of strap hook 28 includes a rectangular opening 49.

Referring to FIG. 4, the front of strap hook retainer 28 is shown. A front top cross-member 56 extends between and is fixed to the upper portion of walls 42 and 44, while a front bottom cross-member 58 extends between and is fixed to the lower portion of walls 42 and 44. Front end faces of walls 42 and 44 as well as front top and bottom cross-members 56 and 58 define a front opening 60 of a given dimension less than the given dimension of rear opening 48. At the top of wall 42 proximate top plate 32 is a bore 55, and likewise at the top of wall 44 proximate top plate 32 is a bore 54. A pivot lever, or rod 52 extends through bores 55 and 54 and curves downwardly following along the outside of wall 44. Secured by welding or otherwise to lever 52 is a plate 50 that is essentially freely swingable or pivotable within the frame constituted by walls 42, 44 and top plate 32. Thus, as lever 52 is moved or pivoted as indicated by the arrow in FIG. 2, the plate 50 also moves or pivots therewith. However, plate 50 is limited in its pivotal movement as discussed below.

The length of plate 50 is sized according to the rear opening 48 and the front opening 60 in the following relationship that determines the pivot travel length of plate 50. The rear opening 48 is dimensioned to allow plate 50 to outwardly swing or pivot beyond the plane defined by the rear opening 48, while the front opening 60 is smaller in dimension to restrict plate 50 from pivoting or swinging beyond the plane defined by the front opening 60. The reason for this will become apparent hereinbelow with reference to FIGS. 5–7 and the description of operation.

Referring now to FIGS. 5–7, the manner of operation of the present strap hook retainer 28 will be described. As depicted in FIG. 5 a strap 26 is partially shown being attached to a strap hook 30. Strap hook 30 includes an eye or opening 65 in shank 64 through which the strap is received, looped, and sewn back on itself. Strap hook 30 includes an angled segment 68 that defines a U-shaped member having a recess 66. In its normal or rest state, plate 50 of the strap hook retainer 28 is vertical. To engage and retain the strap hook 30, the strap hook 30 is inserted into the front opening 60. The strap hook 30 will contact the plate 50 as the strap hook 30 is further pushed therethrough. Referring particularly to FIG. 6, the strap hook 30 is further pushed through the front opening 60 such that the strap hook 30 exits the strap hook retainer 28 through the rear opening 48, while at the same time causing plate 50 to outwardly pivot from the rear opening 48. The strap hook 30 is pushed through rear opening 48 until the end of segment 68 is beyond the free end of plate 50 wherein plate 50 falls into the U-shaped recess 66. The strap hook 30 is now pulled back through the rear opening 48 until the segment 68 is encased by the body or frame of the strap hook retainer.

Referring to FIG. 7 the strap hook 30 is shown retained within the strap hook retainer 28. Because plate 50 is restrained from pivoting outwardly by the front opening 60, strap hook 30 being engaged by the plate 50, is likewise prevented from exiting the front opening 60. If slack is encountered in the strap 26 the strap hook 30 is thus retained within the frame.

In order to release the strap hook 30 from the strap hook retainer 28 it is necessary to manually pivot the plate 50 outwardly through the rear opening 48. This necessarily carries strap hook 30 with the plate through the rear opening 48. Manual pivoting of plate 50 is accomplished by grasping lever 52 and forwardly swinging the lever 52 until the strap hook 30 may be disengaged from the plate 50. While holding lever 52 in the rotated position, thus maintaining the plate 50 in a raised position, the strap hook 30 may disengage from plate 50 and pull back through the rear opening 48 and the front opening 60.

Figure 8:
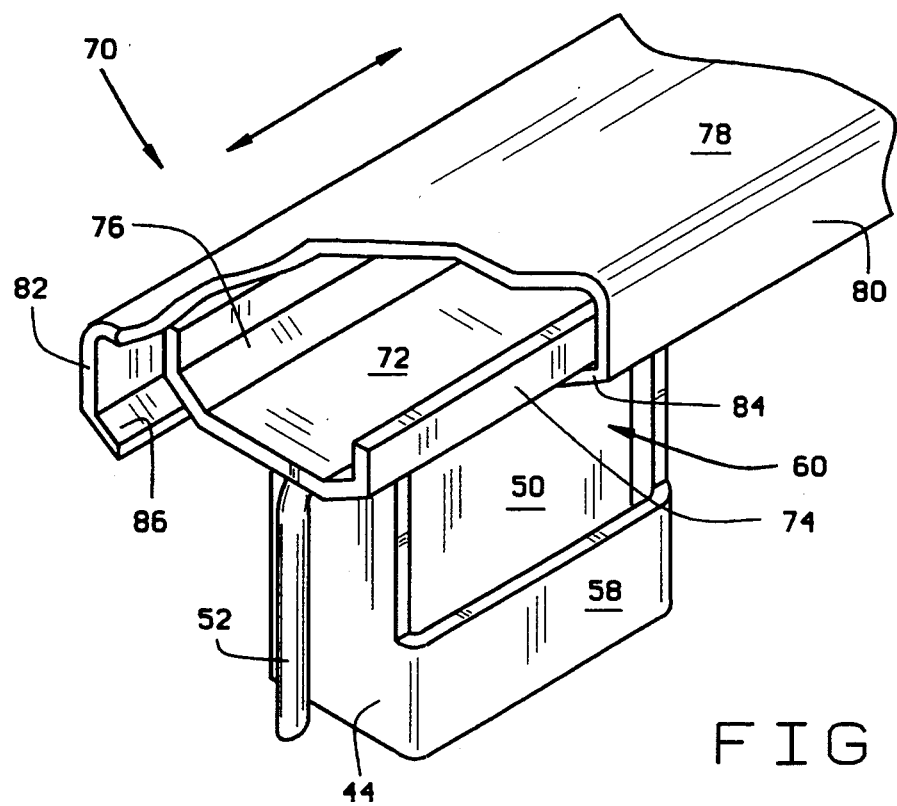
FIG. 8 is a partial cutaway view of an alternative mounting structure for the present strap hook retainer.
Figure 9:
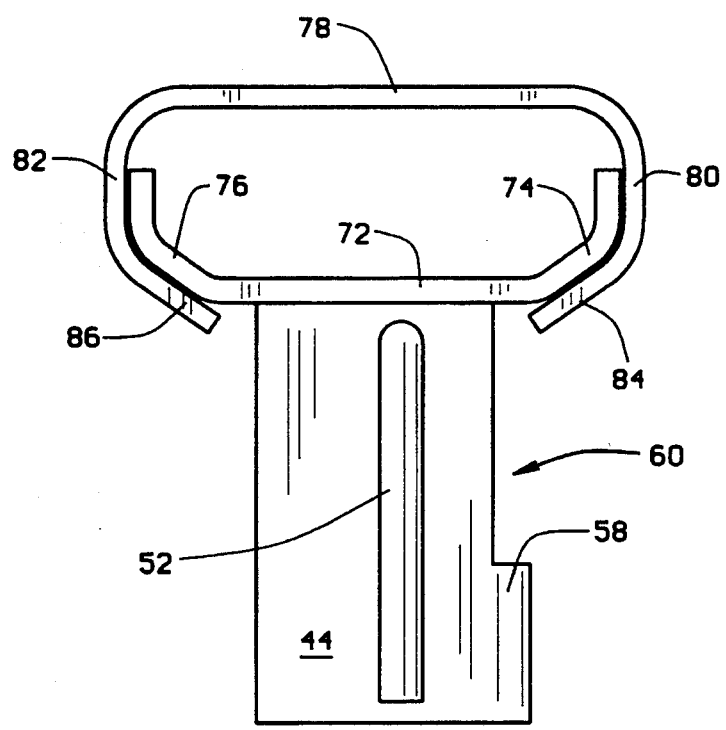
FIG. 9 is a side view of the strap hook retainer of FIG. 8.

An alternative embodiment of the present strap hook retainer is depicted in FIGS. 8 and 9, and attention is now directed to FIGS. 8 and 9 with the alternative embodiment of the strap hook retainer generally designated 70. It should be noted that the features and components of strap hook retainer 70 that are mechanically and functionally the same as strap hook retainer 28 are numerically labeled the same. Strap hook retainer 70 includes a top plate 72 that includes two upwardly curved edges 74 and 76. Surrounding top plate 72 is a track or rail 78 that includes two side rails 80 and 82 that respectively have underturned ledges or flanges 84 and 86. As best seen in FIG. 9, ledges 84 and 86 are dimensioned to surround flanges 74 and 76 to provide a track-like device. In this embodiment, strap hook retainer 70 may be longitudinally positioned along and within the rail 78. Rail 78 is mounted to the underside of an existing rail of a flatbed trailer, such as to the rail 22 of the flatbed 14 of FIG. 1. Operation of the strap hook retainer 70 is the same as that for strap hook retainer 28 with the additional freedom of being able to adjustably slide the strap hook retainer along the longitudinal length of the flatbed.

While the foregoing is directed to the preferred embodiment of the present invention, other and further embodiments of the invention may be devised without departing from the basic scope thereof, and the scope thereof is determined by the claims which follow.

What is claimed is:

1. An assembly for releasably retaining a U-shaped strap hook of a tie-down strap utilized to secure cargo onto a platform, the retaining assembly comprising:
a frame adapted to be mounted to the platform;
a plate pivotably disposed within said frame;
a front opening in said frame, said front opening being dimensioned so that said plate will not pivotably extend therethrough;
a rear opening in said frame, said rear opening having a given dimension to allow said plate to pivotably extend therethrough;
said plate being sized to engage the U-shaped portion of the strap hook when the strap hook is passed through said rear opening and said front opening to thus retain the strap hook in engagement with said assembly; and
a pivot lever attached to said plate, said pivot lever permitting manual pivoting of said plate to disengage the strap hook from said assembly;
said frame including; a first side wall; a second side wall; a front plate extending between and secured to said first and second side walls, said front opening disposed in said front plate; a rear plate extending between and secured to said first and second side walls and spaced from said front plate, said rear opening disposed in said rear plate; a top plate attached to a top surface of said first and second side walls, said top plate adapted to be attached to the platform; a first bore in said first side wall proximate said top plate; and a second bore in said second side wall proximate said top plate, said pivot lever extending through said first and second bores.

2. An assembly for releasably retaining a U-shaped strap hook of a tie-down strap utilized to secure cargo onto a truck trailer, the retaining assembly comprising:
a frame adapted to be mounted to a side of the trailer;
a front opening disposed in said frame;
a rear opening disposed in said frame opposite said front opening;
a vertically extending plate disposed in said frame between said front opening and said rear opening, said plate being pivotally mounted so as to swing outwardly beyond a plane defined by said rear opening, said plate being prevented by said frame from swinging outwardly beyond a plane defined by said front opening;
said plate being adapted to engage the strap hook when the strap hook is inserted into said front opening and forced against said plate so as to cause said plate to pivot through said rear opening as the strap hook is further inserted into said frame, said plate adapted to engage the U-shaped portion of the strap hook when the strap hook is passed a sufficient distance through said frame and to retain the strap hook when said plate and the strap hook are withdrawn into said frame;
a pivot lever attached to said plate and forming a pivot axis for said plate;
said frame including; a first side wall; a second side wall; a front plate extending between and secured to said first and second side walls, said front opening disposed in said front plate; a rear plate extending between and secured to said first and second side walls and spaced from said front plate, said rear opening disposed in said rear plate; a top plate attached to a top surface of said first and second side walls, said top plate adapted to be attached to the truck trailer; a first bore in said first side wall proximate said top plate; and a second bore in said second side wall proximate said top plate, said pivot lever extending through said first and second bores.

* * * * *